US011193448B2

(12) United States Patent
Scherer et al.

(10) Patent No.: US 11,193,448 B2
(45) Date of Patent: Dec. 7, 2021

(54) PISTON FOR AN INTERNAL COMBUSTION ENGINE

(71) Applicant: FEDERAL-MOGUL NÜRNBERG GMBH, Nuremberg (DE)

(72) Inventors: Michael Scherer, Fürth (DE); Christoffer Schmoll, Nuremberg (DE); Kilian Röck, Nuremberg (DE)

(73) Assignee: Federal-Mogul Nurnberg GmbH, Nuremberg (DE)

( * ) Notice: Subject to any disclaimer, the term of this patent is extended or adjusted under 35 U.S.C. 154(b) by 0 days.

(21) Appl. No.: 16/978,235

(22) PCT Filed: Mar. 4, 2019

(86) PCT No.: PCT/EP2019/055283
§ 371 (c)(1),
(2) Date: Sep. 4, 2020

(87) PCT Pub. No.: WO2019/170589
PCT Pub. Date: Sep. 12, 2019

(65) Prior Publication Data
US 2021/0003092 A1    Jan. 7, 2021

(30) Foreign Application Priority Data
Mar. 5, 2018  (DE) .................... 10 2018 203 226.2

(51) Int. Cl.
*F02F 3/22*     (2006.01)
*F16J 1/04*     (2006.01)
*F16J 1/18*     (2006.01)

(52) U.S. Cl.
CPC .. *F02F 3/22* (2013.01); *F16J 1/18* (2013.01)

(58) Field of Classification Search
CPC .................... F02F 3/00; F16J 1/04; F16J 1/16
See application file for complete search history.

(56) References Cited

U.S. PATENT DOCUMENTS

| 4,817,505 | A | * | 4/1989 | Rhodes | ...................... F16J 1/02 92/232 |
|---|---|---|---|---|---|
| 5,299,490 | A | | 4/1994 | Harrer et al. | |
| 6,279,456 | B1 | | 8/2001 | Ueshima et al. | |

(Continued)

FOREIGN PATENT DOCUMENTS

| DE | 4109160 A1 | 9/1992 |
|---|---|---|
| DE | 102009032379 A1 | 2/2010 |

(Continued)

OTHER PUBLICATIONS

International Search Report, dated Jun. 18, 2019 (PCT/EP2019/055283).

*Primary Examiner* — Long T Tran
(74) *Attorney, Agent, or Firm* — Robert L Stearns; Dickinson Wright, PLLC

(57) ABSTRACT

A piston for an internal combustion engine has box walls (18), which are each formed between skirt walls (12) and gudgeon pin bosses (10). At least one of the box walls (18) on a thrust side at least on the lower edge and at least on the inner side, starting from the gudgeon pin boss (10), in a first portion (20), runs largely straight and is inclined outwards, and then runs curved inwards, and then, in a second portion (16), runs largely straight and inclined inwards to the skirt wall (12).

18 Claims, 1 Drawing Sheet

(56) References Cited

U.S. PATENT DOCUMENTS

| | | | |
|---|---|---|---|
| 6,357,341 B1* | 3/2002 | Watanabe | F02F 3/00 123/193.6 |
| 2002/0046593 A1* | 4/2002 | Ribeiro | B23P 15/10 72/377 |
| 2008/0307958 A1* | 12/2008 | Scharp | F02F 3/0015 92/208 |
| 2010/0147251 A1* | 6/2010 | Blau | F02F 3/00 123/193.6 |
| 2011/0114054 A1* | 5/2011 | Miller | F02F 3/00 123/193.6 |
| 2011/0174153 A1 | 7/2011 | Hettich et al. | |
| 2012/0260869 A1 | 10/2012 | Freidhager | |
| 2015/0027400 A1 | 1/2015 | Adelmann et al. | |
| 2015/0027401 A1* | 1/2015 | Gniesmer | F02F 3/0069 123/197.3 |
| 2016/0169150 A1* | 6/2016 | Freidhager | F02F 3/22 123/193.6 |
| 2016/0245223 A1* | 8/2016 | Kuhnel | F02F 3/02 |
| 2017/0175671 A1* | 6/2017 | Menotti | F02F 3/003 |
| 2018/0266557 A1* | 9/2018 | Braig | F02F 3/02 |

FOREIGN PATENT DOCUMENTS

| | | |
|---|---|---|
| DE | 102009045437 A1 | 4/2011 |
| DE | 102012203570 A1 | 9/2013 |
| DE | 102013214738 A1 | 1/2015 |
| JP | H0392544 U | 9/1991 |
| JP | H09242603 A | 9/1997 |
| JP | 2012122384 A | 6/2012 |
| JP | 5640706 A | 12/2014 |
| JP | 2016128663 A | 7/2016 |

\* cited by examiner

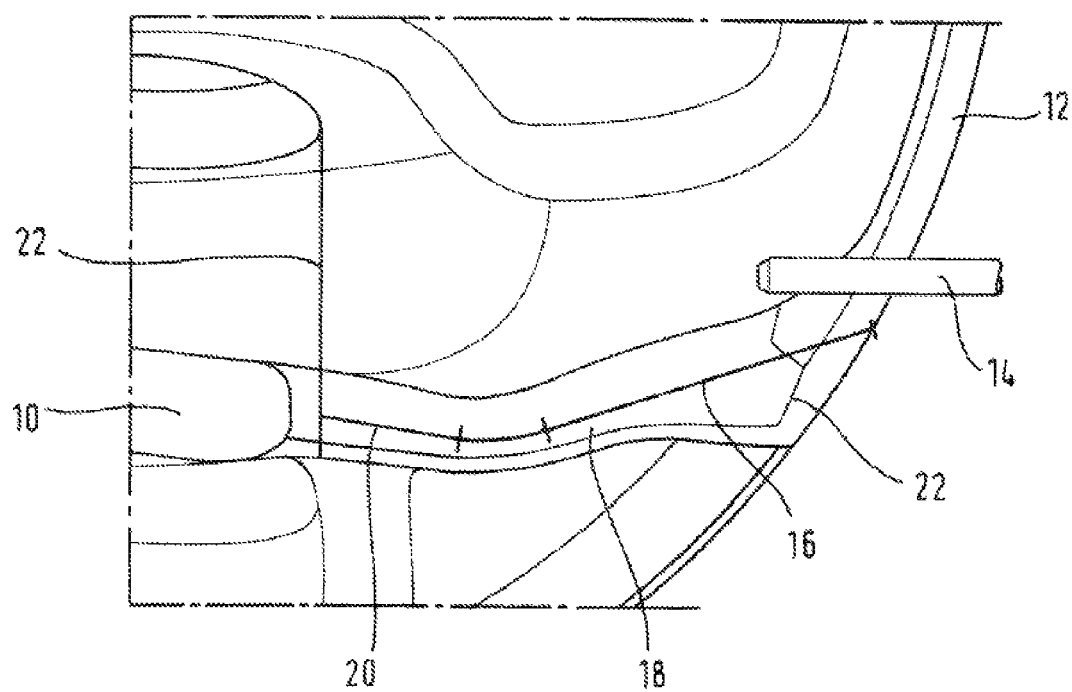

PISTON FOR AN INTERNAL COMBUSTION ENGINE

BACKGROUND

1. Technical Field

The invention relates to a piston for an internal combustion engine.

2. Related Art

Pistons of internal combustion engines firstly have diametrically opposed skirt walls, which are parts of cylinder jacket surfaces which during operation slide along the cylinder bore or a cylinder liner inserted therein. In an inner region, viewed in the direction of the piston stroke axis, there are further provided gudgeon pin bosses which serve to receive a gudgeon pin by means of which the piston is connected to a connecting rod. The connections between the skirt walls and the gudgeon pin bosses are termed skirt connections, connecting walls or box walls. Typically, four such box walls, two for connecting the skirt wall on the thrust side and two for connecting the skirt wall on the counter-thrust side, are provided.

In particular the thrust-side box walls are subjected to high mechanical loads since, during the working stroke, a horizontal lateral force which presses the thrust-side skirt wall against the cylinder wall acts due to the gas pressure on the piston crown and the inclined position of the connecting rod. This lateral force is transmitted through the box walls from the gudgeon pin boss onto the skirt wall. This leads to high compressive stresses on the inner side, i.e. that side of the box walls which is directed towards the piston stroke axis.

Further, what is termed the change in contact face has to be taken into account, if, namely at the upper dead centre, the lateral force changes from the counter-thrust side to the thrust side. In this connection, the contact between the cylinder bore and the skirt walls of the piston also changes from the counter-thrust side to the thrust side. In the course of this change in contact face as well, high compressive stresses occur on the inner side of the skirt walls, in particular on the lower edge, what is termed the open skirt end. Insufficient strength may result in cracking at the open skirt end, which is one of the most common types of damage in pistons for spark-ignition engines.

In order to counteract this, it is known for example from DE 10 2009 032 379 A1 to form the skirt connections in particular on the inner side in a largely straight manner and, when viewed from below, to incline them inwards starting from the gudgeon pin boss. In other words, the distance of the box wall to an imaginary plane perpendicular to the gudgeon pin axis decreases starting from the gudgeon pin boss. A similar configuration is known from DE 10 2012 203 570 A1.

In configuring the skirt connections, however, further constraints have to be observed, in particular the length of the gudgeon pin and the position of an oil nozzle for spraying cooling oil into a cooling duct or onto an underside of the piston. In particular, the inwards-inclined, straight course of the box walls described above would lead to gudgeon pin bosses which lie comparatively far to the outside, which increases the piston weight and makes adaptations of the gudgeon pin necessary. This conflict is resolved, for example, in accordance with DE 10 2013 214 738 A1, DE 41 09 160 A1, U.S. Pat. No. 6,279,456 B1 and JP 56-40706 B2, by skirt connections which are curved overall. This does create space for a cooling oil nozzle, without the gudgeon pin bosses having to be shifted outwards, but such configurations are disadvantageous with regard to strength.

Finally, DE 10 2009 045 437 A1 discloses a piston with connecting walls, not described in greater detail, with a cutout for a cooling oil nozzle.

SUMMARY

Given this background, an object of the invention is to create a piston which is optimised with regard to the combination of strength and flexibility of design with regard to the position of a cooling oil nozzle and/or of the gudgeon pin bosses.

Accordingly, a piston has at least one box wall on a thrust side which at least on the lower edge and at least on the inner side, starting from the gudgeon pin boss, in a first portion, runs largely straight and inclined outwards, then runs curved inwards, and then, in a second portion, runs largely straight and inclined inwards to the skirt wall. In other words, when viewed from below along the piston stroke axis, starting from the gudgeon pin boss, the distance of the inner side of the box wall to an imaginary plane perpendicular to the gudgeon pin boss which contains the piston stroke axis initially increases. This is adjoined by a comparatively short curved portion which connects the first portion described in a tangentially constant manner to a second portion which runs inclined inwards so that the distance to the abovementioned plane decreases. In the last-named region, the configuration which is ideal from a point of view of strength can thus be undertaken, which leads to very uniformly and homogeneously distributed compressive stresses so that the risk of cracking is considerably reduced. Only in the region of the curved portion described does a slight local stress concentration occur. The straight first portion which is inclined outwards starting from the gudgeon pin boss furthermore provides the space necessary for a cooling oil nozzle, without the gudgeon pin bosses having to be moved outwards in a disadvantageous manner.

With respect to strength, it could be established that, compared with a straight, non-inclined skirt connection, by means of which the same distance to an oil nozzle can be obtained, the strength with the configuration according to the invention is approximately 16% greater. Improved strength is further yielded compared with a configuration of the skirt connections which is curved overall. At the same time, existing manufacturing methods can be applied, and the piston weight and also the skirt flexibility, which determines friction losses and noise, are not adversely affected.

In first simulations, it turned out that the requirements described above can be met particularly well if the inclination of the first portion with respect to a plane perpendicular to the piston axis is less than the inclination of the second portion with respect to a plane perpendicular to the piston axis.

In particular, an angle to an imaginary plane perpendicular to the gudgeon pin axis of less than 15°, in particular less than 13°, and particularly preferably approximately 9°, is currently preferred for the inclination of the first portion outwards.

In particular with regard to strength, good results are expected for an inclination of the second portion with respect to a plane perpendicular to the gudgeon pin axis in the range from 10° to 25°, in particular 15° to 20°, and particularly preferably at approximately 18°.

The requirements are further satisfied particularly well if the second portion is formed longer than the first, in particular 2.0 to 3.0 times, and particularly preferably 2.3 to 2.7 times, and in particular approximately 2.5 times, as long. In such case, an edge line of the inner face of the gudgeon pin bore located on the side of the box wall under consideration, projected onto a plane perpendicular to the piston axis, is considered as the start of the first portion. The end of the first portion is formed by the start of the curved portion. The second portion extends from the end of the curved portion up to the outer surface of the skirt wall.

In order to keep the unavoidable stress peaks particularly low, it is preferred for the curved portion between the first and the second portion to be considerably shorter than the first portion. In particular, good results are expected for a configuration in which the arc length of the curved portion is less than 75%, in particular less than 65%, and particularly preferably approximately 64%, of the length of the first portion.

Even though this has little influence for achieving the advantages according to the invention, it is preferred for the outer side of at least one box wall to be configured, optionally with the exception of a widened portion in the region of the connection to the skirt wall, to correspond to the inner side, in other words to have a substantially constant thickness, and/or likewise to have the two largely straight portions described above with the comparatively short curved portion therebetween. As mentioned, the described configuration on the inner and outer side applies at least for the lower edge of at least one, preferably both, skirt wall(s) on the thrust side. The skirt walls may be configured correspondingly in their further course in the direction of the piston stroke axis and in particular, at least in portions, run largely parallel to the piston stroke axis.

As already becomes clear from the above, the piston according to the invention displays particular advantages in conjunction with a cooling oil nozzle provided in the piston housing of an engine so that it is preferred for the piston to have at least one cooling duct, even though it is likewise conceivable that the cooling oil nozzle does not supply a cooling duct, but merely the underside of the piston, with cooling oil.

Further, the piston according to the invention is preferably used as a piston for a spark-ignition engine.

BRIEF DESCRIPTION OF THE DRAWING

The invention will be discussed in greater detail below with reference to an embodiment illustrated in the drawing.

The FIGURE shows a partial bottom view of a piston with a cooling oil nozzle.

DETAILED DESCRIPTION OF A PREFERRED EMBODIMENT OF THE INVENTION

In the FIGURE, approximately a "quarter" of a piston with a gudgeon pin boss 10 and a thrust-side skirt wall 12 is shown in a bottom view. Further, a cooling oil nozzle 14 is indicated. 16 marks a line which would be optimal with regard to a homogeneous stress distribution in the connecting or box wall 18 between the gudgeon pin boss 10 and the skirt wall 12. As can be recognised in particular by means of an imaginary extension of the line 16 in the FIGURE towards the left up to the gudgeon pin boss 10, this, when sufficient space is created for the cooling oil nozzle 14, would however move the gudgeon pin boss comparatively far outwards, i.e. downwards in the FIGURE, which would be disadvantageous with respect to the necessary gudgeon pin length and the piston weight.

In accordance with the invention, this is taken into account in that the box wall according to the line 20, in a first portion, runs largely in a straight manner and is inclined at least slightly outwards. This means that it does not extend perpendicular to the gudgeon pin axis (running from top to bottom in the FIGURE), but its distance from a plane perpendicular to the gudgeon pin axis, which would be recognisable as running from left to right in the FIGURE, increases, the farther the line 20 moves away from the gudgeon pin boss 10 and approaches the skirt wall 12. In this case, the line 20, with regard to its preferred ratio of dimensions with respect to the line 16, as described above, starts at the projection of the inner face of the gudgeon pin boss 10, marked as line 22.

Adjoining a comparatively short curved and tangentially constant transition which can be recognised in the FIGURE in particular on the inner side of the box wall 18, the box wall runs inclined inwards corresponding to the "ideal" line 16 so that its distance to a plane perpendicular to the piston axis decreases with its course in the direction of the skirt wall 12. Accordingly, the region of the line 16 between the end of the curved portion and the skirt wall 12 forms the second portion described above, and the marked line 20 forms the first portion.

Furthermore, the measures described above can be recognised in the FIGURE, according to which the inclination of the first portion 20 is less than that of the second portion 16, and the arc length of the curved portion is considerably shorter than the first portion 20, and the latter is considerably shorter than the second portion 16. It should be mentioned that the shape of the connecting wall with the two largely straight portions described and the curved portion therebetween can also be referred to as a "boomerang". Further, it can be recognised in the FIGURE that the outer side of the connecting or box wall 18 (at the bottom in the FIGURE) largely coincides with the course on the inner side, with a widened portion 22 being provided in the region of the connection to the skirt wall 12.

The invention claimed is:

1. A piston for an internal combustion engine comprising box walls, which are each formed between skirt walls and gudgeon pin bosses, wherein at least one box wall on a thrust side at least on the lower edge and at least on the inner side, starting from the gudgeon pin boss, in a first portion, runs largely straight and inclined outwards, then runs curved inwards, and then, in a second portion, runs largely straight and inclined inwards to the skirt wall.

2. The piston according to claim 1, wherein the inclination of the first portion with respect to a plane perpendicular to the gudgeon pin axis is less than the inclination of the second portion with respect to the plane perpendicular to the gudgeon pin axis.

3. The piston according to claim 1, wherein the inclination of the first portion with respect to a plane perpendicular to the gudgeon pin axis is less than 15°.

4. The piston according to claim 2, wherein the inclination of the second portion with respect to a plane perpendicular to the gudgeon pin axis is 10 to 25°.

5. The piston according to claim 1, wherein the second portion is longer than the first portion.

6. The piston according to claim 1, wherein the curved portion is shorter than the first portion.

7. The piston according to claim 1, wherein the outer side of at least one box wall runs corresponding to the inner side.

8. The piston according to claim 1, including a cooling duct.

9. The piston according to claim 1, wherein the piston is for a spark-ignition engine.

10. A combination of a piston according to claim 1 with a cooling oil nozzle which is provided in the region of the second portion.

11. The piston according to claim 3, wherein the inclination is less than 13°.

12. The piston according to claim 4, wherein the inclination is 15° to 20°.

13. The piston according to claim 5, wherein the second portion is 2 to 3 times longer than the first portion.

14. The piston according to claim 5, wherein the second portion is 2.3 to 2.7 times longer than the first portion.

15. The piston according to claim 6, wherein the curved portion has an arc length which is less than 75% of the length of the first portion.

16. The piston according to claim 6, wherein the curved portion has an arc length which is less than 65% of the length of the first portion.

17. The piston according to claim 7, except for a widened portion in the region of the connection to the skirt wall.

18. The piston according to claim 10, wherein the nozzle is provided in the middle region of the second portion.

* * * * *